(12) United States Patent
Oneta et al.

(10) Patent No.: US 10,001,357 B2
(45) Date of Patent: Jun. 19, 2018

(54) COORDINATE MEASURING APPARATUS

(71) Applicant: Mitutoyo Corporation, Kawasaki, Kanagawa (JP)

(72) Inventors: Takao Oneta, Tochigi (JP); Koji Takesako, Tochigi (JP); Tomomitsu Sugawara, Tochigi (JP); Mitsuru Fukuda, Tochigi (JP); Kazuaki Kawarai, Tochigi (JP)

(73) Assignee: MITUTOYO CORPORATION, Kawasaki (JP)

( * ) Notice: Subject to any disclaimer, the term of this patent is extended or adjusted under 35 U.S.C. 154(b) by 147 days.

(21) Appl. No.: 15/279,638

(22) Filed: Sep. 29, 2016

(65) Prior Publication Data
US 2017/0097220 A1  Apr. 6, 2017

(30) Foreign Application Priority Data

Oct. 1, 2015 (JP) .................................. 2015-196203

(51) Int. Cl.
*G01B 5/008* (2006.01)
*G01B 21/04* (2006.01)

(52) U.S. Cl.
CPC .......... *G01B 5/008* (2013.01); *G01B 21/047* (2013.01)

(58) Field of Classification Search
CPC ............................ G01B 5/008; G01B 21/047
USPC ......................................................... 33/503
See application file for complete search history.

(56) References Cited

U.S. PATENT DOCUMENTS

| 2005/0225901 | A1* | 10/2005 | Otsubo .................. F16C 29/00 360/234.3 |
| 2012/0072156 | A1* | 3/2012 | Fukuda ................ G01B 5/0016 702/95 |
| 2016/0258734 | A1* | 9/2016 | Anzai .................... G01B 5/008 |
| 2017/0227050 | A1* | 8/2017 | Poglitsch ............ F16C 32/0622 |
| 2017/0370689 | A1* | 12/2017 | Hemmings .......... G01B 21/045 |
| 2018/0058833 | A1* | 3/2018 | Ruck .................... G01B 21/047 |

FOREIGN PATENT DOCUMENTS

JP    2012-042267    3/2012

* cited by examiner

*Primary Examiner* — G. Bradley Bennett
(74) *Attorney, Agent, or Firm* — Rankin, Hill & Clark LLP

(57) ABSTRACT

A coordinate measuring apparatus includes a base on which an object to be measured is mounted, a movable X-axis beam, a Y-axis column with a hollow part that is provided on the base and supports the X-axis beam, a control unit that is provided under the base and controls the movement of the X-axis beam, and a cable that is wired from the X-axis beam to the control unit through the hollow part of the Y-axis column.

13 Claims, 7 Drawing Sheets

COORDINATE MEASURING APPARATUS

CROSS-REFERENCE TO RELATED APPLICATIONS

The present application claims priority to the Japanese Patent Application number 2015-196203, filed on Oct. 1, 2015. The contents of this application are incorporated herein by reference in their entirety.

BACKGROUND OF THE INVENTION

The present invention relates to a coordinate measuring apparatus, more particularly, a coordinate measuring apparatus in which a mobile body and a control unit are connected with a cable.

A coordinate measuring machine that measures coordinates of an external form of an object to be measured is used as a coordinate measuring apparatus for measuring a shape and a size of the object to be measured. For example, the coordinate measuring machine disclosed in Japanese Unexamined Patent Application Publication No. 2012-42267 comprises a base that an object to be measured is mounted on, a moving mechanism that relatively moves a probe for measuring the object to be measured on this base in directions of three axes (an X-axis, a Y-axis, and a Z-axis) that are mutually orthogonal, a drive control unit that drives and controls this moving mechanism, and a cable that connects the moving mechanism and the drive control unit.

Since the moving mechanism and the drive control unit are generally arranged apart from each other in the coordinate measuring apparatus, the cable that connects the moving mechanism and the control unit tends to be exposed to the outside. In such a case, a space is required for arranging the cable exposed to the outside. Further, when the cable is exposed to the outside, there are possibilities that the cable becomes dirty and the coordinate measuring apparatus becomes disfigured. Furthermore, the cable must be protected with a cableveyor (Registered Trademark) to prevent the exposed cable from being damaged by irregular bending, but using the cableveyor increases the cost.

BRIEF SUMMARY OF THE INVENTION

This invention focuses on these points, and aims to provide a coordinate measuring apparatus that is capable of preventing a cable from being exposed to the outside with a simple structure.

According to one aspect of the invention, a coordinate measuring apparatus that comprises a base that an object to be measured is mounted on, a movable body that can relatively move with respect to the base, a supporting body with a hollow part, the supporting body being erected on the base and supporting the movable body, a control unit that is provided under the base and controls the movement of the movable body, and a cable that is wired from the movable body to the control unit through the hollow part of the supporting body is provided.

DETAILED DESCRIPTION OF THE INVENTION

1. First Exemplary Embodiment

[1-1. Structure of the Coordinate Measuring Apparatus]

An example of a structure of a coordinate measuring apparatus 1 according to the first exemplary embodiment of the present invention is explained with reference to FIG. 1.

Figure 1:
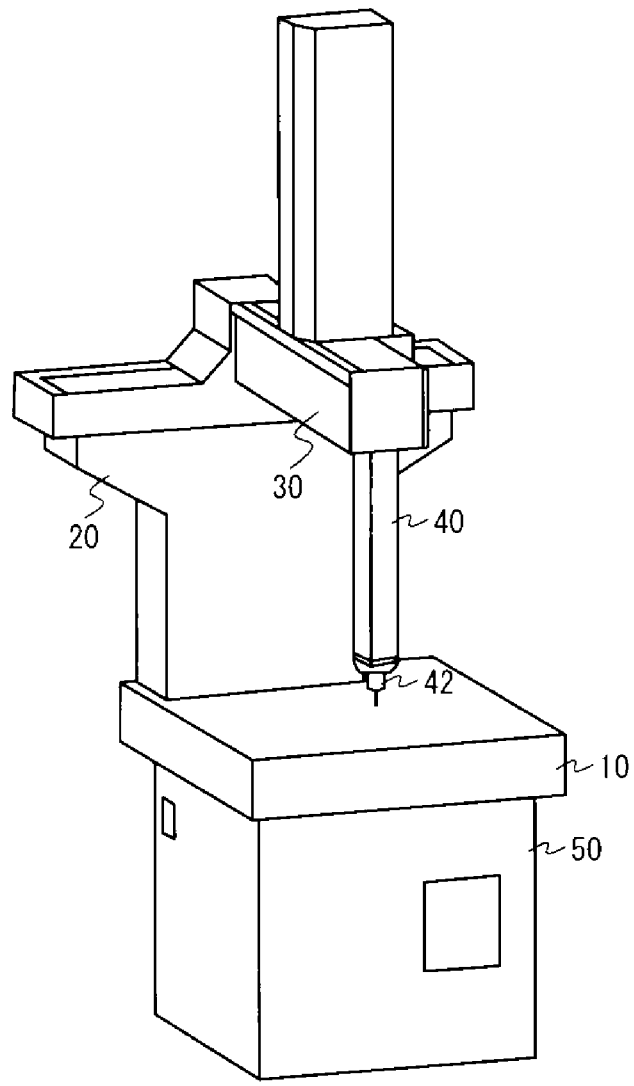
FIG. 1 shows a perspective view of an example of a structure of a coordinate measuring apparatus 1 according to the first exemplary embodiment of the invention.

FIG. 1 shows a perspective view of the example of the structure of the coordinate measuring apparatus 1 according to the first exemplary embodiment of the invention. The coordinate measuring apparatus 1 is a coordinate measuring machine that identifies a three-dimensional shape of an object to be measured by measuring coordinates of an external form of the object to be measured. As shown in FIG. 1, the coordinate measuring apparatus 1 includes a base 10, a Y-axis column 20, an X-axis beam 30, a Z-axis spindle 40, a probe 42, and a mounting stand 50.

The base 10 is a stone-made surface plate set on the mounting stand 50. An object to be measured (a work) is mounted on the upper surface of the base 10. The base 10 has a rectangular shape in a planar view.

The Y-axis column 20 is a supporting body with a hollow part that is erected on the upper surface of the base 10 and supports the X-axis beam 30. The Y-axis column 20 is fixed on the upper surface of the base 10. The Y-axis column 20, as seen from the X-axis direction in FIG. 1, is formed to have a substantially T-shaped structure extending in the Y-axis direction on the edge of the upper surface of the base 10. The Y-axis column 20 movably supports an end part of the X-axis beam 30 in the longitudinal direction (the X-axis direction in FIG. 1). That is, in the present exemplary embodiment, the Y-axis column 20 supports the X-axis beam 30 in a cantilever structure. Hence, compared with the case where both longitudinal ends of the X-axis beam 30 are supported, the coordinate measuring apparatus 1 can be miniaturized and it becomes easier for an operator to mount the object to be measured on the base 10.

The X-axis beam 30 is a beamlike member extending in the X-axis direction that is orthogonal to the Y-axis column 20. The X-axis beam 30 is a movable body that moves in the Y-axis direction. It should be noted that the coordinate measuring apparatus 1 includes a scale and a detecting sensor for detecting a movement amount (coordinate) of the X-axis beam 30 in the Y-axis direction. Further, the upper part of the Y-axis column 20 is provided with a driving mechanism that moves the X-axis beam 30.

The Z-axis spindle 40 is a prism-shaped member extending in the Z-axis direction that is movably coupled to the X-axis beam 30. The Z-axis spindle 40 moves in each of the Y-axis direction and the Z-axis direction. It should be noted that the coordinate measuring apparatus 1 includes a scale and a detecting sensor for detecting a movement amount (coordinate) of the Z-axis spindle 40 in the Y-axis direction and the Z-axis direction. Further, the X-axis beam 30 is provided with a driving mechanism that moves the Z-axis spindle 40.

The probe 42 is provided to the tip of the lower side of the Z-axis spindle 40. The coordinate measuring apparatus 1 measures coordinates of an external form of an object to be measured by detecting the movement amounts (coordinates) of the X-axis beam 30 and the Z-axis spindle 40 when a contact provided on the tip of the probe 42 contacts the object to be measured on the base 10.

The mounting stand 50 is provided under the base 10 and supports the base 10. The setting base 50 also functions as a housing part that houses therein a control unit (a control unit 52 shown in FIG. 2) that controls movement of the X-axis beam 30 and the Z-axis spindle 40. The control unit 52 is connected with a cable (a cable 55 shown in FIG. 2) extending from inside of the X-axis beam 30.

[1-2. Wiring State of the Cable]

A wiring state of the cable 55 between the control unit 52 and the X-axis beam 30 is explained with reference to FIGS. 2 to 4.

Figure 2:
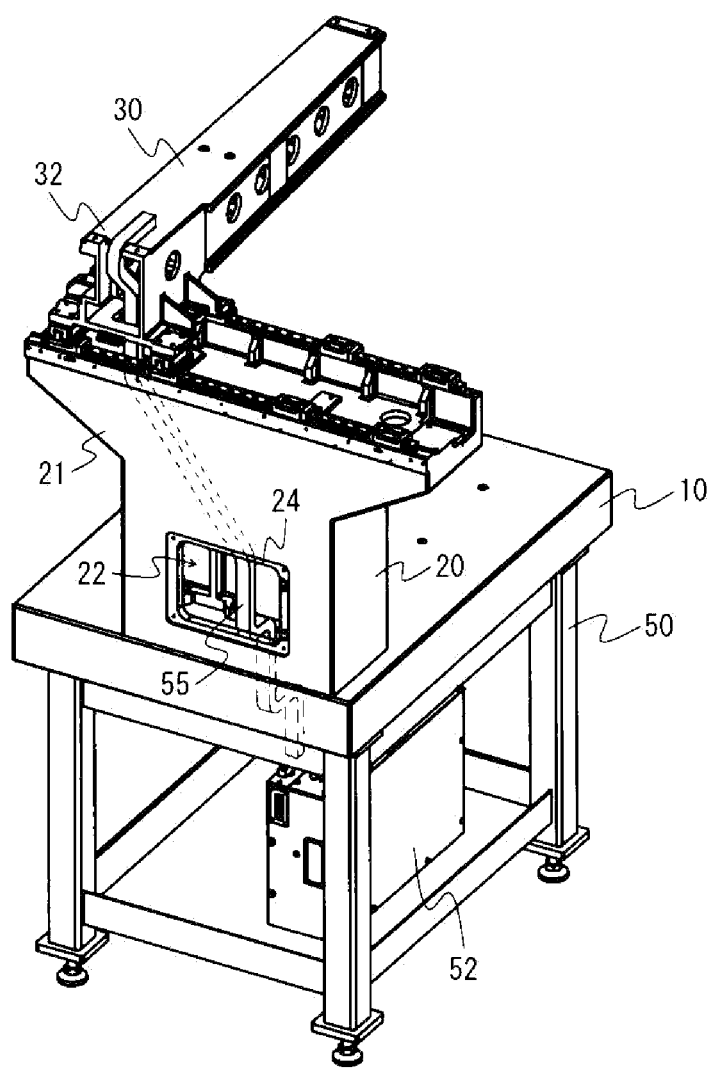
FIG. 2 shows a diagram for explaining a wiring state of a cable 55 between a control unit 52 and an X-axis beam 30.

FIG. 2 shows a diagram for explaining the wiring state of the cable 55 between the control unit 52 and the X-axis beam 30. FIG. 3 shows a diagram for explaining an internal structure of the Y-axis column 20. FIG. 4 shows a diagram for explaining a structure of the upper part of the Y-axis column 20. It should be noted that FIG. 2 is a diagram of the coordinate measuring apparatus 1 shown in FIG. 1 as seen from the back side, and the Z-axis spindle 40 and side plates of the mounting stand 50 are omitted for convenience of explanation.

As shown in FIG. 2, the cable 55 connects the X-axis beam 30 and the control unit 52. Particularly, one end side of the cable 55 is connected to an end part 32 side of the X-axis beam 30, and the other end side of the cable 55 is connected to the control unit 52. It should be noted that the one end side of the cable 55 is branched. One part of the branched cable 55 is connected to the driving mechanism that is provided on the upper part of the Y-axis column 20 and moves the X-axis beam 30, and the other part is connected to the driving mechanism that is provided on the X-axis beam 30 and moves the Z-axis spindle 40.

In the present exemplary embodiment, the cable 55 passes through the hollow part 22 in the Y-axis column 20 located between the X-axis beam 30 and the control unit 52 such that the cable 55 is not exposed to the outside. That is, the hollow part 22 of the Y-axis column 22 is a housing part that houses the cable 55. The cable 55 moves in the Y-axis direction together with the X-axis beam 30 when the X-axis beam 30 moves in the Y-axis direction. In this manner, space can be conserved because a space for wiring the cable 55 on the periphery of the Y-axis column 20 is not required since the cable 55 passes through the hollow part 22.

The cable 55 is not restrained, and is hung down in the hollow part 22. Further, the cable 55 has rigidity against bending and twisting and is housed in the hollow part 22 with a fixed bent shape (for example, a bent shape shown in FIG. 2). In such a case, the cable 55 can be prevented from being twisted and entangled by maintaining the fixed bent shape of the cable 55 that moves with the X-axis beam 30 even when the X-axis beam 30 moves in the Y-axis direction.

Openings are formed in each of the bottom part and the upper part of the Y-axis column 20 such that the cable 55 can pass therethrough. Specifically, a rectangular-shaped bottom part aperture 23 is formed in the bottom part of the Y-axis column 20 as shown in FIG. 3. Further, a guide hole 26 is formed in the upper part of the Y-axis column 20 as shown in FIG. 4. The guide hole 26 is a long hole formed along the Y-axis direction and guides the movement of the cable 55 in the Y-axis direction. In this manner, the cable 55 can move in the Y-axis direction when the X-axis beam 30 moves.

Figure 3:
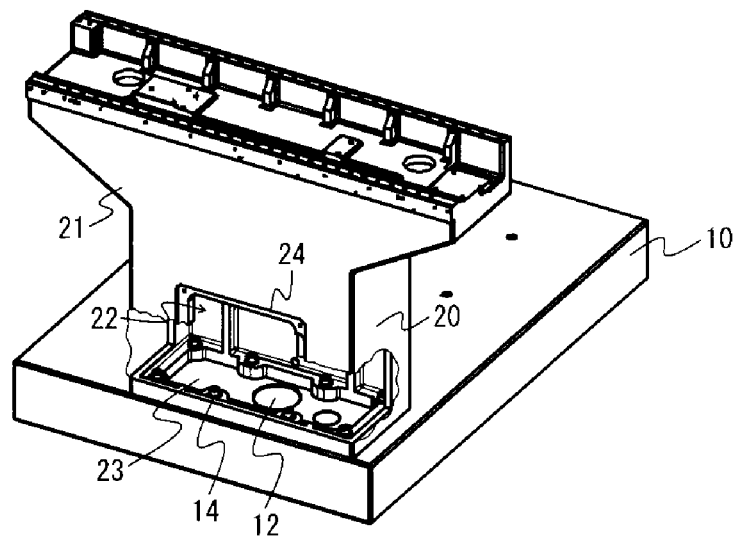
FIG. 3 shows a diagram for explaining an internal structure of a Y-axis column 20.
Figure 3:
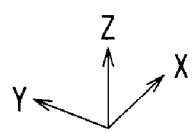
Figure 4:
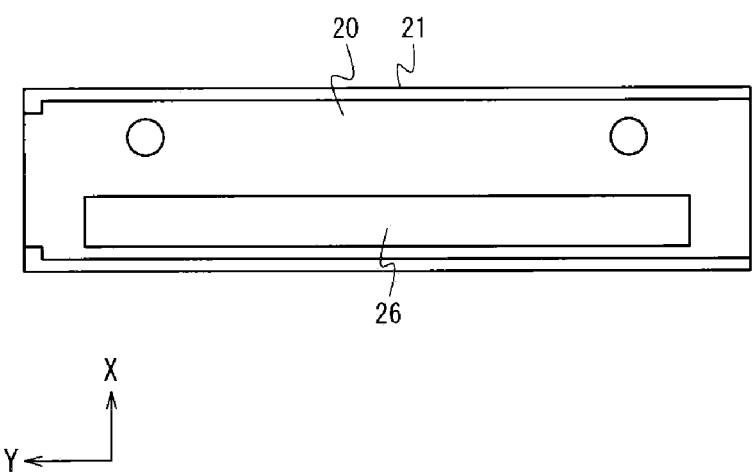
FIG. 4 shows a schematic diagram for explaining a structure of the upper part of the Y-axis column 20.

The cable 55 passes through a through-hole 12 of the base 10 and shown in FIG. 3, and is connected to the control unit 52. The through-hole 12 is a circular hole formed in the lower part of the Y-axis column 20 as shown in FIG. 3. The through-hole 12 is formed such that at least a partial area thereof overlaps with an area of the hollow part 22 of the Y-axis column 20. In such a case, the cable 55 passes through the inside of the Y-axis column 20 and the base 10 located between the X-axis beam 30 and the control unit 52 such that the cable 55 can be effectively prevented from becoming exposed to the outside. Further, the wiring length of the cable 55 can be shortened by allowing the cable 55 to pass through inside of the Y-axis column 20 and the base 10.

Returning to FIG. 2, an opening part 24 is provided on a back side 21 that is a side face of the Y-axis column 20. A rectangular aperture is formed in the opening part 24. The aperture is formed at a position from where the cable 55 can be seen. Further, the aperture has a size that, for example, a hand of a worker can pass through (move in and out). In a case where such an opening part 24 is provided, wiring the cable 55 becomes easier in the Y-axis column 20 because the worker can reach the cable 55 by inserting his/her hand through the aperture of the opening part 24.

It should be noted that the bottom part of the Y-axis column 20 and the base 10, which are separate components, are fastened by a plurality of screws 14 (8 screws in FIG. 3) that are fastening members, as shown in FIG. 3. In the present exemplary embodiment, the opening part 24 is provided in the bottom part side of the back side 21 of the Y-axis column 20 such that the screws 14 are seen from the opening part 24 to make it easier for the worker to fasten the screws 14 during manufacturing. Specifically, the opening part 24 is formed at a position from which fingers of the worker can reach the screws 14 when he/she inserts his/her hand from the aperture. In such a case, the worker can easily fix the Y-axis column 20 to the base 10 because the worker can insert his/her hand from the aperture of the opening part 24 and fasten the screws 14.

The upper surface side of the base 10 is provided with a concave part with previously-arranged bushing screws for engaging with the screws 14. In such a case, assembling the coordinate measuring apparatus 1 during manufacturing becomes easier because the worker can easily fix the Y-axis column 20 to the base 10 only by fastening the screws 14 with the hand inserted through the aperture of the opening part 24.

Though not shown in FIG. 2 and FIG. 3, a cover for blocking the aperture of the opening part 24 can be mounted on the back side 21. In this manner, an operator of the coordinate measuring apparatus 1 can be prevented from erroneously inserting his/her hand into the aperture of the opening part 24.

The aperture of the opening part 24 is rectangular in the above explanation, but is not limited to this shape. For example, the aperture may be circular. Further, the opening part 24 was assumed to be on the back side 21 of the Y-axis column 20 in the above explanation, but it is not so limited. For example, the opening part 24 may be on a side face other than the back side 21.

Furthermore, the Y-axis column 20 is a cantilever supporting structure that supports an end part of the X-axis beam 30 in the longitudinal direction in the above explanation, but it is not so limited. For example, two columns that support the respective end parts of the X-axis beam 30 in the longitudinal direction may be provided. Moreover, the X-axis beam 30 that is supported by the Y-axis column 20 erected on the fixed base 10 was assumed to move in the Y-axis direction in the above explanation, but it is not so limited. For example, the X-axis beam 30 may be fixed and the base 10 may move in the Y-axis direction. That is, the X-axis beam 30 that relatively moves in the Y-axis with respect to the base 10 can be used.

[1-3. Effect of the First Exemplary Embodiment]

As described above, in the first exemplary embodiment, the cable 55 is wired from the X-axis beam 30 to the control unit 52 through the hollow part 22 of the Y-axis column 20. In such a case, the cable 55 can be prevented from becoming exposed to the outside because the cable 55 that moves along the movement of the X-axis beam 30 is housed in the hollow part 22. In this manner, space can be conserved because a space for wiring the cable 55 on the periphery of the Y-axis column 20 is not required. Further, because the cable 55 is not exposed to the outside, the cable 55 can be prevented from becoming dirty and the coordinate measuring apparatus 1 can be prevented from becoming disfigured.

2. Second Exemplary Embodiment

[2-1. Structure of the Coordinate Measuring Apparatus]

The structure of the coordinate measuring structure 1 according to the second exemplary embodiment of the present invention is explained with reference to FIG. 5.

Figure 5:
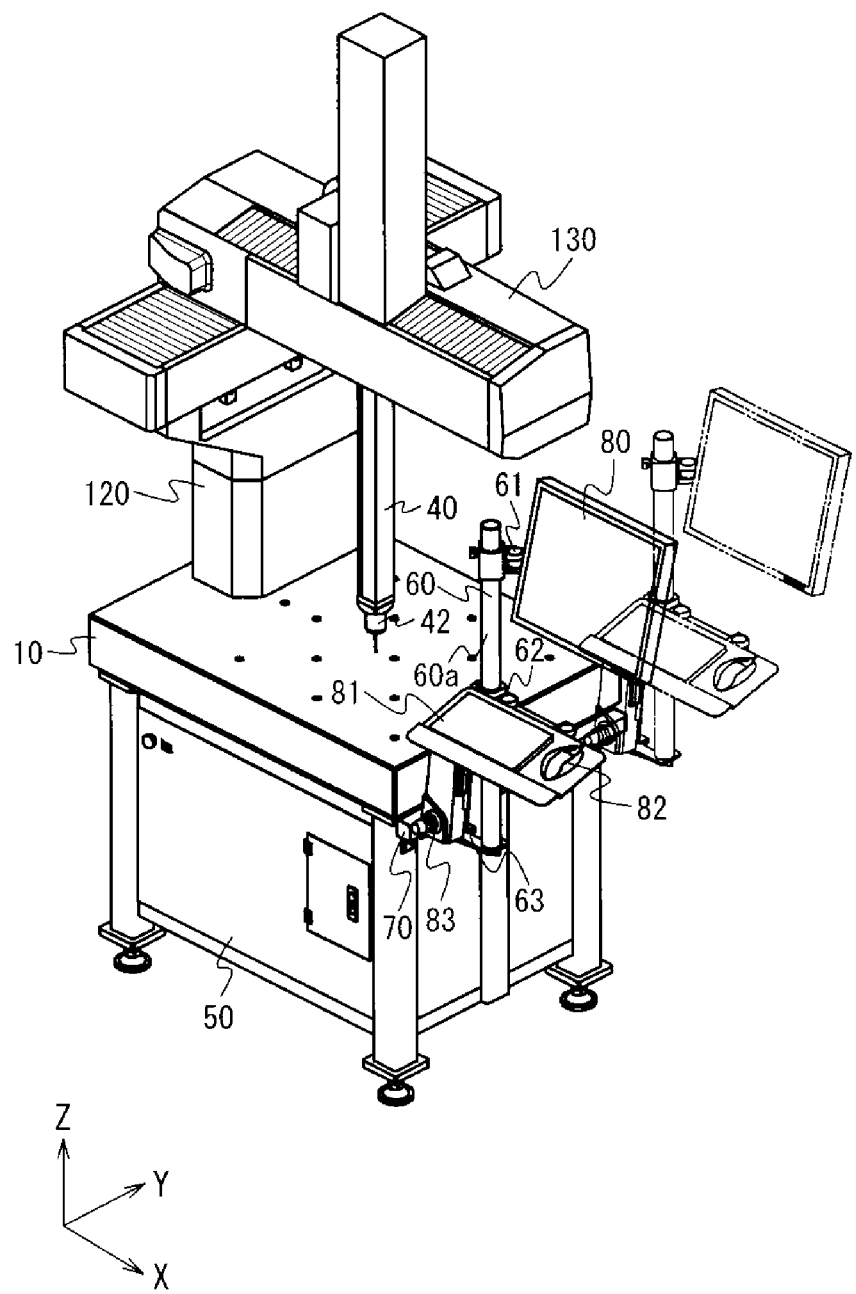
FIG. 5 shows a perspective view of an example of the structure of the coordinate measuring apparatus 1 according to the second exemplary embodiment.

FIG. 5 shows a perspective view of an example of the structure of the coordinate measuring apparatus 1 according to the second exemplary embodiment. The coordinate measuring apparatus 1 according to the second exemplary embodiment includes a base 10, a Y-axis column 120, an X-axis column 130, a Z-axis spindle 40, a probe 42, a mounting stand 50, a supporting arm 60, and a sliding mechanism 70 as shown in FIG. 5. The structures of the base 10, the Z-axis spindle 40, the probe 42, and the mounting stand 50 are the same as those of the first exemplary embodiment, and so a detailed description thereof is omitted.

The X-axis beam 130 is a beamlike member extending in the X-axis direction, like the X-axis beam 30 (FIG. 1) described in the first exemplary embodiment. The X-axis beam 130 is a movable body that moves in the Y-axis direction.

The Y-axis column 120 is arranged to extend in the Y-axis direction at an end side of the X-axis direction. The Y-axis column 120 movably supports an end part of the X-axis beam 130 in the longitudinal direction (the X-axis direction). The Y-axis column 120 includes a hollow part (the hollow part 22 in FIG. 2) therein, like the Y-axis column 20 of the first exemplary embodiment. A cable (the cable 55 in FIG. 2) that connects the X-axis beam 130 and a control unit (the control unit 52 in FIG. 2) passes through the hollow part. In this manner, the cable can be prevented from becoming exposed to the outside.

The supporting arm 60 supports a display 80, a keyboard 81, a mouse 82, and a joystick 83. The supporting arm 60 includes a first supporting part 61 that supports the display 80 which is a displaying device for displaying measurement results, a second supporting part 62 that supports the keyboard 81 and the mouse 82 which are input devices, and a third supporting device 63 that supports the joystick 83 allowing an operator to operate the movement of the X-axis beam 130 and the Z-axis spindle 40. The first supporting part 61 and the second supporting part 62 have structures rotatable with respect to an arm body 60a, such that the orientation of the display 80 and the like can be adjusted.

It should be noted that the supporting arm 60 does not necessarily support all of the display 80, the keyboard 81, the mouse 82, and the joystick 83. For example, when a touch panel is provided on the display 80, the supporting arm 60 supports the display 80 but does not have to support the keyboard 81 and the mouse 82.

The sliding mechanism 70 slides the supporting arm 60 in the Y-axis direction. The sliding mechanism 70 is provided at an end part of the mounting stand 50 that is on the side opposite the side where the Y-axis column 120 is provided. The supporting arm 60 is slid by the sliding mechanism 70 between a position shown by a solid line (a front position) and a position shown by a two-dot chain line (a rear position) in FIG. 5. For example, when no measuring is performed, the operator can easily mount an object to be measured on the base 10 by locating the supporting arm 60 at the rear position. On the other hand, when measuring is performed, the operator can easily recognize the contents on the display 80 and execute an input operation with the keyboard 81 and the like by locating the supporting arm 60 at the front position.

[2-2. Details of the Sliding Mechanism]

Figure 6:
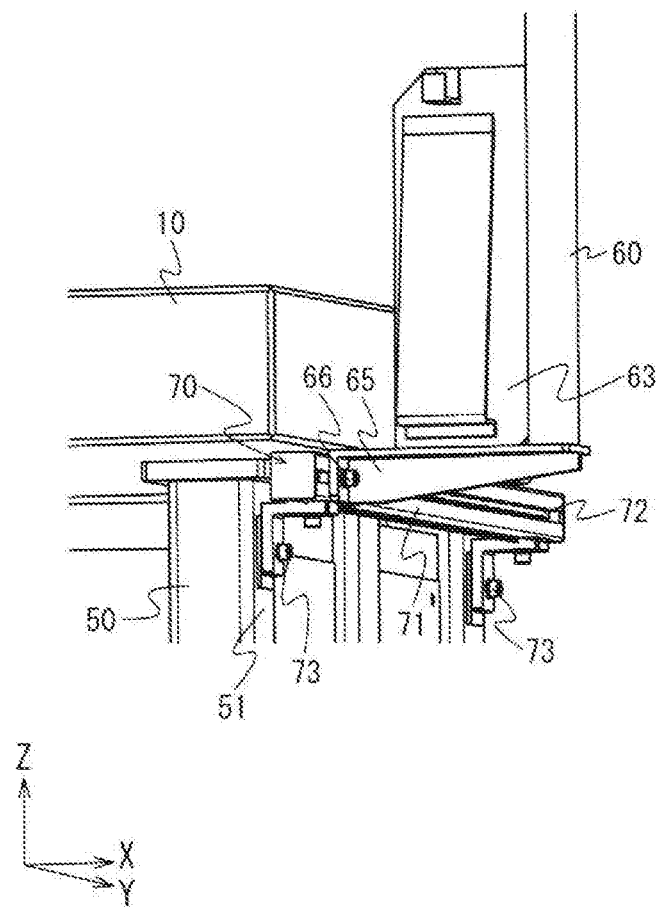
FIG. 6 shows a perspective view of a structure of a sliding mechanism 70.
Figure 7:
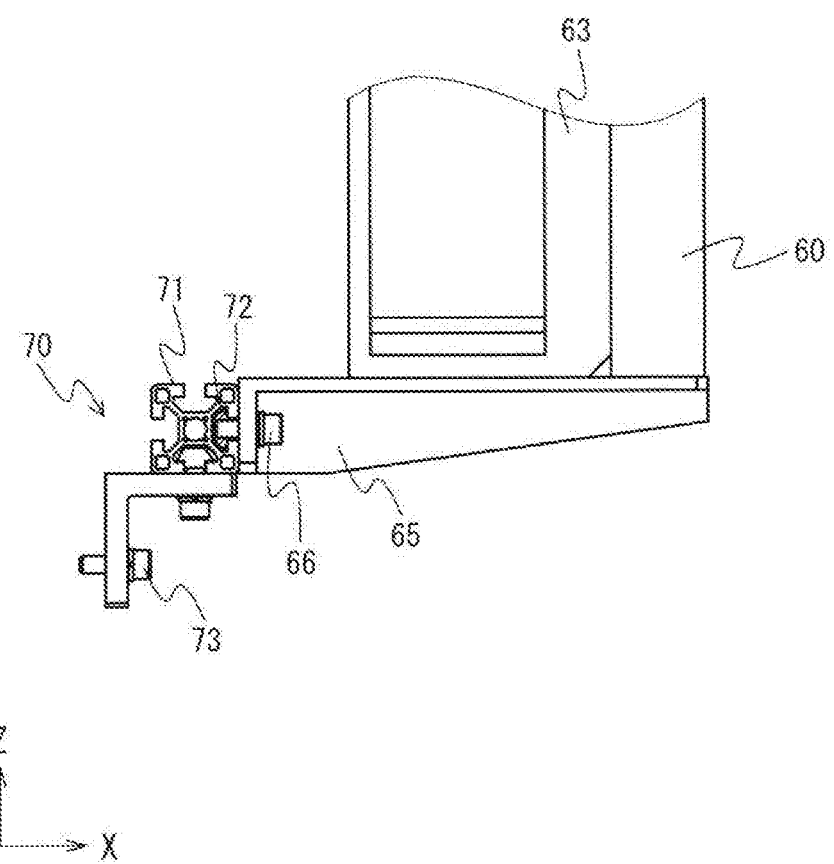
FIG. 7 shows a diagram for explaining a mounting structure for mounting a supporting arm 60 to the sliding mechanism 70.

The details of the sliding mechanism 70 are explained with reference to FIG. 6 and FIG. 7. FIG. 6 shows a perspective view of the structure of the sliding mechanism 70. FIG. 7 shows a diagram for explaining the mounting structure for mounting the supporting arm 60 to the sliding mechanism 70.

As shown in FIG. 6, the sliding mechanism 70 includes a rail part 71 provided on a side face 51 of the mounting stand 50. The rail part 71 is fixed to an upper part of the side face 51 (that is, under the base 10) by screws 73. The supporting arm 60 is slidably coupled to the rail part 71. The rail part 71 is attached along the Y-axis direction and guides the movement of the supporting arm 60 in the Y-axis direction. A slot 72 is formed along the Y-axis direction on the face of the rail part 71 where the supporting arm 60 is coupled to.

As shown in FIG. 7, a lower part 65 of the supporting arm 60 is slidably coupled to the rail part 71 by a screw 66 being screwed with a slider that can slide through the slot 72, which is an insertion opening. For example, the slot 72 is drawn into the side of the lower part 65 by screwing the screw 66, and the lower part 65 and the rail part 71 are coupled. In such a case, the supporting arm 60 can be slid in the Y-axis direction with a simple structure.

The sliding mechanism 70 may be provided with a lock mechanism that locks a sliding position of the supporting arm 60. For example, the lock mechanism locks the supporting arm 60 located at the rear part (the position shown by the two-dot chain line in FIG. 5). For example, when measuring is performed, the operator unlocks the lock mechanism and moves the supporting arm 60 to the front position (the position shown by the solid line in FIG. 5). By providing the lock mechanism, the supporting arm 60 can be prevented from being moved when, for example, an external force is applied to the coordinate measuring apparatus 1.

It should be noted that, as shown in FIG. 5, the Y-axis column 120 was assumed to be provided at one end side in the X-axis direction (corresponding to the first direction) and the sliding mechanism 70 was assumed to be provided at the other end side in the X-axis direction in the above explanation, but they are not so limited. For example, the setting position of the sliding mechanism 70 may be the position shown in FIG. 8.

Figure 8:
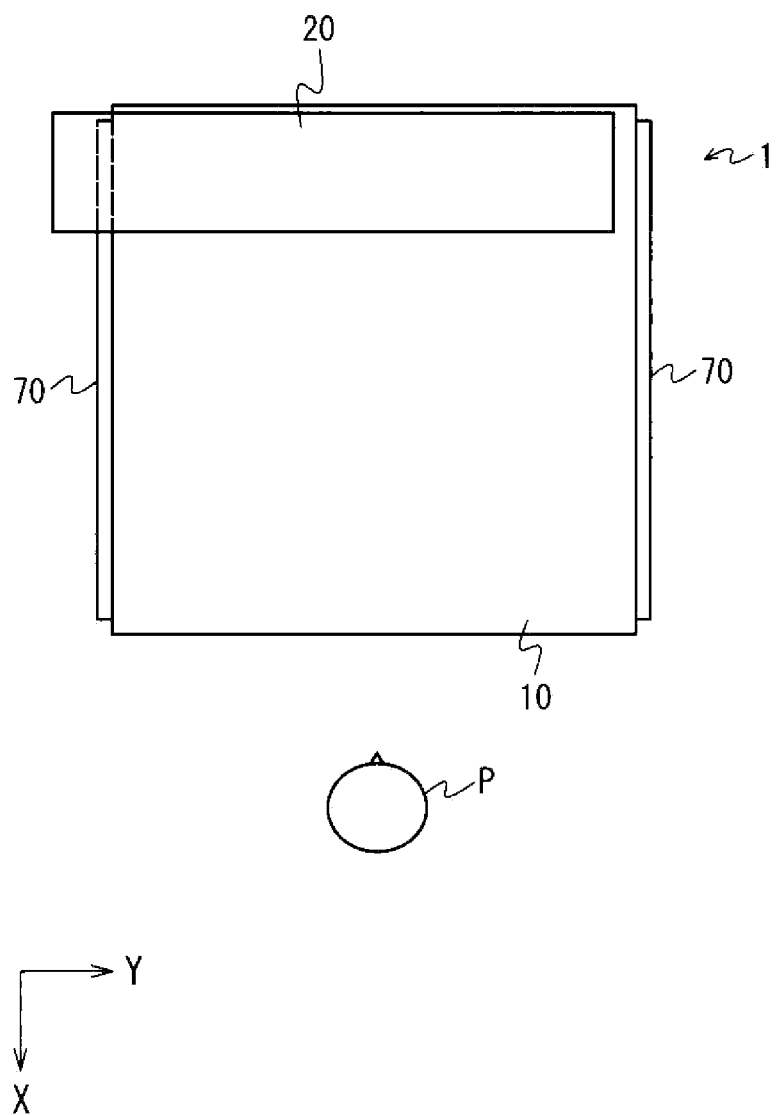
FIG. 8 shows a schematic view for explaining a variation of a setting position of the sliding mechanism 70.

FIG. 8 shows a schematic view for explaining a variation of the setting position of the sliding mechanism 70. FIG. 8 is a diagram of the coordinate measuring apparatus 1 as seen from above, and only the base 10, the Y-axis column 20, and the sliding mechanism 70 are illustrated for convenience of explanation. Further, an operator P is assumed to be in front of the coordinate measuring apparatus 1 (a position when measuring is performed) in FIG. 8.

The Y-axis column 20 is provided at the deep side of the base 10 as seen from the operator P, specifically, an end side in the X-axis direction (corresponding to the second direction). The sliding mechanisms 70 are provided at both end sides in the Y-axis direction that is orthogonal to the X-axis direction. In the variation, the supporting arm 60 (see FIG. 5) is detachably coupled to any one of the two rail parts 71. In such a case, usability of the coordinate measuring apparatus 1 is enhanced because the supporting arm 60 can be mounted in accordance with the setting place of the coordinate measuring apparatus 1, the operator's dominant hand, and the like.

Although the sliding mechanisms 70 were assumed to be provided at the both end sides in the Y-axis direction in the variation, they are not so limited. For example, the sliding mechanism 70 may be provided at the one end side or the other end side in the Y-axis direction.

Further, although the sliding mechanism 70 was assumed to be provided on the side face 51 of the mounting stand 50 (FIG. 6) in the above explanation, it is not so limited. For example, the sliding mechanism 70 may be provided on the side face of the base 10. However, providing the sliding mechanism 70 on the mounting stand 50 is preferable because it is easier to process the metal-made mounting stand 50 for mounting the sliding mechanism 70 compared with the stone-made base 10.

[2-3. Effect of the Second Exemplary Embodiment]

As described above, in the second exemplary embodiment, the sliding mechanism 70 slides the supporting arm 60 that supports the display 80 and the like. Specifically, as shown in FIG. 5, the supporting arm 60 is slid in the Y-axis direction between the front position and the rear position. In such a case, the supporting arm 60 can be slid in accordance with a usage state of the coordinate measuring apparatus 1. For example, by arranging the supporting arm 60 at the rear position when no measuring is performed, it becomes easier for an operator to operate when the operator mounts an object to be measured on the base 10 and removes an object to be measured from the base 10 because the display 80 and the like supported by the supporting arm 60 do not interfere the operator. On the other hand, by arranging the supporting arm 60 at the front position when measuring is performed, the operator can easily see the contents on the display 80 and can easily conduct an input operation with the keyboard 81 and the like.

Further, in the second exemplary embodiment, a cable (the cable 55 in FIG. 2) that connects the X-axis beam 130 and a control unit passes through the hollow part in the Y-axis column 120, like in the Y-axis column 20 of the first exemplary embodiment. In such a case, a stronger effect is achieved by the coordinate measuring apparatus 1 that slides the supporting arm 60 because the movement of the supporting arm 60 can be prevented from being interfered with the cable.

It should be noted that the coordinate measuring apparatus 1 is a coordinate measuring machine that measures coordinates of an external form of an object to be measured mounted on the base 10 in the above explanation, but it is not so limited. For example, the coordinate measuring apparatus 1 may be a measuring apparatus that images an object to be measured mounted on the base 10 while moving.

The present invention is described with the exemplary embodiments of the present invention but the technical scope of the present invention is not limited to the scope described in the above embodiment. It is apparent for those skilled in the art that it is possible to make various changes and modifications to the embodiment. It is apparent from the description of the scope of the claims that the forms added with such changes and modifications are included in the technical scope of the present invention.

What is claimed is:

1. A coordinate measuring apparatus, comprising:
   a base that an object to be measured is mounted on;
   a movable body that can relatively move with respect to the base;
   a supporting body with a hollow part, the supporting body being erected on the base and supporting the movable body;
   a control unit that is provided under the base and controls the movement of the movable body; and
   a cable that is wired from the movable body to the control unit through the hollow part of the supporting body.

2. The coordinate measuring apparatus according to claim 1, wherein
   the base includes a through-hole that is formed under the supporting body, and the cable is connected to the control unit through the through-hole.

3. The coordinate measuring apparatus according to claim 2, wherein
   the through-hole is formed such that at least a partial area thereof overlaps with an area of the hollow part of the supporting body.

4. The coordinate measuring apparatus according to claim 1, wherein
   an opening part is formed in a side face of the supporting body.

5. The coordinate measuring apparatus according to claim 4, wherein
   an aperture of the opening part has a size allowing a hand of a worker to be moved in and out of the aperture.

6. The coordinate measuring apparatus according to claim 4, wherein
   a bottom part of the supporting body is fastened to the base by a fastening member, and the opening part is provided to the bottom part side of the side face of the supporting body such that the fastening member is seen from the opening part.

7. The coordinate measuring apparatus according to claim 1, wherein
   the supporting body supports an end part of the movable body in the longitudinal direction of, and the cable is branched and connected to the end part side of the movable body.

8. The coordinate measuring apparatus according to claim 1, wherein
   one end of the cable is connected to a driving mechanism, and the other end of the cable is connected to the control unit.

9. The coordinate measuring apparatus according to claim 1, further comprising:
   a supporting arm that supports a displaying device for displaying measuring results; and
   a sliding mechanism that slides the supporting arm.

10. The coordinate measuring apparatus according to claim 9, wherein
the sliding mechanism includes a rail part provided to a side face of a housing part that houses the control unit, and the supporting arm is slidably coupled to the rail part.

11. The coordinate measuring apparatus according to claim 10, wherein
the supporting arm is detachably coupled to one of the rail parts provided respectively to the two sides of the housing part that are opposed to each other.

12. The coordinate measuring apparatus according to claim 10, wherein
the supporting body supports the movable body at one end side in the first direction on the base, the movable body moving in the second direction that is orthogonal to the first direction, and the rail part is provided on the side face of the other end side in the first direction.

13. The coordinate measuring apparatus according to claim 10, wherein
the supporting body supports the movable body that moves in the first direction that is orthogonal to the second direction at one end side in the second direction on the base, and the rail part is provided on the side face of an end side in the first direction.

* * * * *